United States Patent Office 2,965,889
Patented Dec. 20, 1960

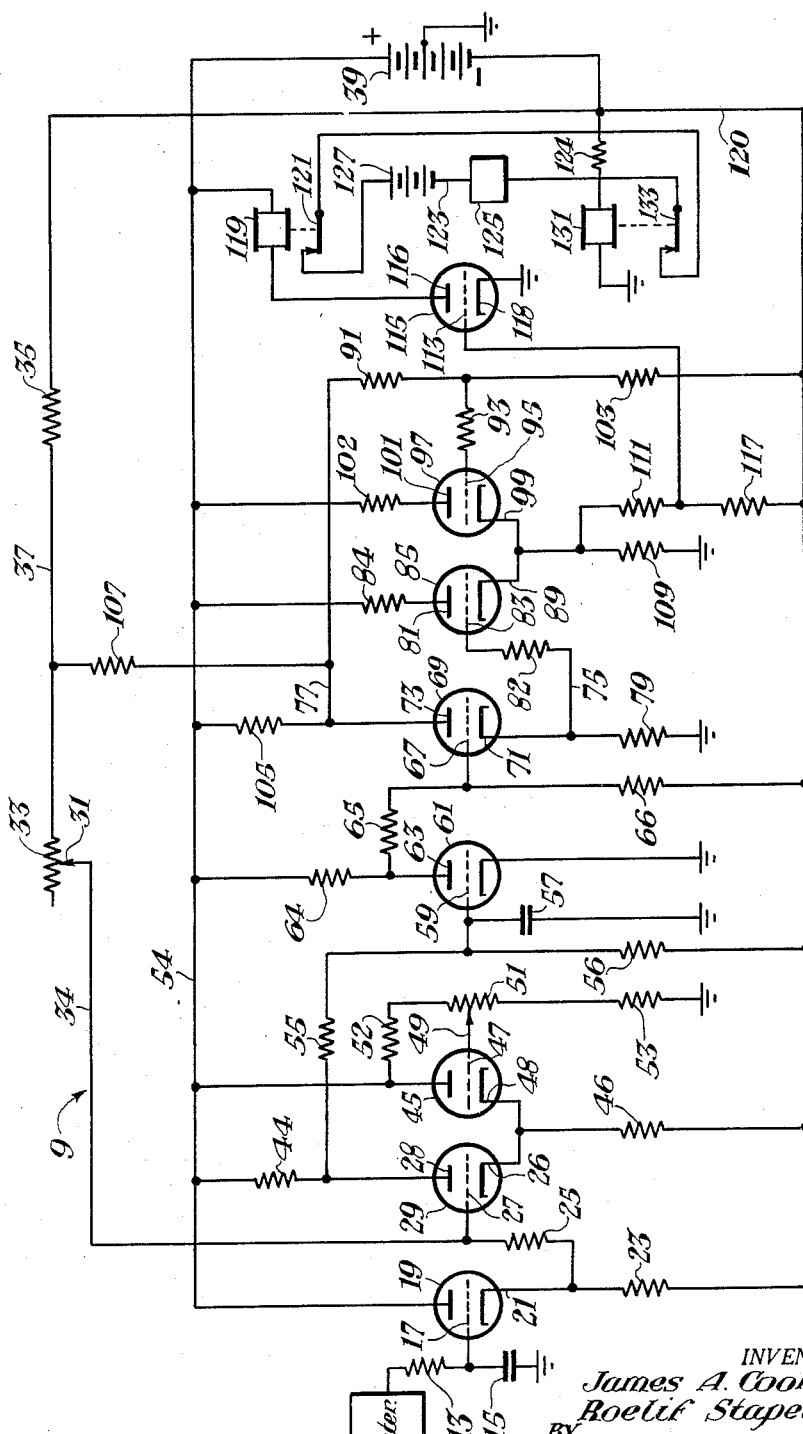

2,965,889

VOLTAGE DETECTOR CIRCUITS

James A. Cook, Jr., Wilkinsburg, and Roelif Stapelfeldt, Pittsburgh, Pa., assignors to Westinghouse Air Brake Company, Wilmerding, Pa., a corporation of Pennsylvania Filed Aug. 7, 1957, Ser. No. 676,731

2 Claims. (Cl. 340—248)

Our invention relates to voltage detector circuits, and more particularly to voltage detector circuits adapted to monitor the amplitude of a voltage signal and to provide an indication of the departure from a preset amplitude level of said voltage signal.

Complex modern electrical and electronic equipment presents a constant problem of supervision and maintenance to prevent dangerous failure or inaccurate operation. In order to prevent the cost of such supervision and maintenance from outweighing the economic advantages of the basic equipment, it is desirable to provide automatic checking devices where practical, to indicate when intervention of an operator or maintainer is necessary, or to program circuit changes to avoid the consequences of a malfunction. As is known in the art, control and computing equipment frequently provides predetermined voltages when operating correctly under given conditions, and other voltages when operating improperly under the same conditions. In order to check the operation of such equipment, it would be highly desirable to indicate automatically when selected voltages departed from their desired values. For example, the copending application for Letters Patent of the United States, Serial No. 676,730, filed on August 7, 1957, by David P. Fitzsimmons and William A. Robison, Jr., for Automatic Control System for Railway Classification Yards, discloses an automatic control system for railway classification yards in which two such voltage checks are employed.

The system there disclosed contemplates the use of at least two railroad car retarders in the path of each cut or cars traversing a classification yard, the first controlling the leaving speed of each cut to the desired initial value, and the second controlling the leaving speed of each cut to a value determined by a computer. To insure the proper operation of the second or group retarder, the first or master retarder must succeed in bringing the speed of each cut accurately to the desired initial speed. As disclosed more fully in the above-identified copending application, when this function is performed correctly, the sum of two voltages provided in the system will have a reference value of, say, 100 volts. Secondly, the computer must correctly compute the leaving speed from the second retarder from the inputs supplied. Since the value of the computed leaving speed varies with the inputs, a test cycle is provided in which fixed simulated inputs are supplied to the computer, in response to which, if operating properly, the computer will provide a predetermined output voltage.

It is accordingly an object of the present invention to provide a novel and accurate voltage detector for checking such predetermined voltage amplitude levels, and for providing an output which may be used for indication or control in response to departures from such levels.

In the attainment of the foregoing objects of our invention we provide a voltage amplitude detector circuit having signal amplifying means including means for setting the input amplitude level at which the voltage detector will operate, and first and second electron discharge devices having a common cathode impedance. A first input signal is coupled to said first electron discharge device and a second input signal in opposite phase to said first input signal is coupled to said second electron discharge device. Common output means are connected to the cathode impedance and the said output means are coupled to an electron discharge device employed as an output amplifier. The output amplifier is biased such that it conducts only when both the first and second discharge devices are conducting. Should only one or the other of the discharge devices be conducting, the signal received by the output amplifier will not be of high enough amplitude to cause said amplifier to conduct. A relay is connected to the anode circuit of the output amplifier and is adapted to be energized by conduction of said amplifier to actuate switching means arranged to complete connections in auxiliary circuits, as desired, to provide an indication of any departure from a preset level of the amplitude of the voltage signal being received by the voltage detector circuit.

Other objects and advantages of our invention will become appparent from the following description and the accompany drawing in which the sole figure shows a schematic diagram of a voltage detector circuit embodying our invention.

We shall first describe one embodiment of a voltage detector circuit according to our invention, and shall then point out the novel features thereof in the appended claims.

Referring now to the drawing, a voltage detector circuit 9 according to the present invention includes an electron discharge device 19 connected as a cathode follower receiving the voltage signal from a computer 11. A pair of electron discharge devices 28 and 45 are provided with voltage divider means 33 and 51 in the circuits thereof for adjusting the grid-to-cathode biases in said devices for setting the sensitivity and the amplitude level at which the voltage detector circuit 9 will operate. An electron discharge device 61 which functions as an intermediate amplifier, and an electron discharge device 69 which functions as a paraphase amplifier for converting a single input to a double output of opposite polarity are provided. The voltage detector circuit 9 further includes a pair of electron discharge devices 85 and 97 having a common cathode impedance 109. A single output is taken from the electron discharge devices 85 and 97 across the said common cathode impedance 109 and coupled to an electron discharge device 115 which functions as an output amplifier. A relay 119 is connected in the anode 116 circuit of the amplifier 115. When, and only when, both of the discharge devices 85 and 97 are conducting concurrently will a sufficient voltage be developed across the common cathode impedance 109 to cause the output amplifier 115 to conduct and thereby energize the relay 119 to actuate the relay contacts 121 in such a manner that an auxiliary circuit 123 is rendered operative to provide an indication of the input voltage amplitude variations.

In more detail, the computer 11 is coupled in series through an impedance 13 and in parallel across a filter capacitor 15 to the control grid 17 of the cathode follower 19 which acts as a step-down transformer to connect the output of the computer to the relatively low impedance voltage detector circuit 9. The output of the cathode follower 19 is coupled from its cathode 21 across a cathode impedance 23 and serially through an impedance 25 to the grid 27 of an electron discharge device 29. A feedback circuit including an impedance 107, a voltage divider 33, a wiper arm 31 and a lead 34 couples a negative feedback voltage from the paraphase amplifier 68 to the grid 27 of the electron discharge device 29. Resistors 33 and wiper 31 form the usual voltage divider unit for making the feedback voltage the desired fraction of the output voltage. As is well known, by varying the position of wiper 31 the gain of amplifier stages 29, 61 and 69 can be controlled. The wiper arm 31 of the voltage divider 33 thus provides a means for controlling the feedback voltage to set the sensitivity, that is, the voltage range over which the circuit 9 will operate.

The cathode 26 of the electron discharge device 29 and the cathode 48 of the electron discharge device 45 are connected to one another and to a common cathode impedance 46. An impedance 44 in the anode 28 lead of the electron discharge device 29 is a conventional anode voltage dropping impedance. The grid 47 of the electron discharge device 45 is adjustably biased with respect to the cathode 48, by a wiper arm 49 of a voltage divider 51 such that electron discharge device 45 normally conducts. The divider 51, and the impedances 52 and 53 in series therewith, are connected by a lead 54 between the positive terminal of a center-grounded direct current source 39, and ground reference. The electron discharge device 45 and the bias applied thereto thus established the input amplitude level at which the circuit 9 will operate.

The output of the electron discharge device 29 is coupled from the anode 28 serially through an impedance 55 and a filter capacitor 57 and a resistor 56 to the grid 59 of amplifier 61. An impedance 64 in the anode 63 lead of electron discharge device 61 is a conventional anode voltage dropping impedance. The output signal from the amplifier 61 is coupled from the anode 63 through the impedance 65 to the control grid 67 of an electron discharge device 69 employed as a paraphase amplifier to convert the single signal input to two outputs having opposite polarity. The control grid 67 is biased through the voltage dropping impedances 64, 65 and 66 such that the amplifier 69 normally conducts. The polarity of the two outputs of the amplifier 69 is opposite in phase due to the fact that one output is coupled from the cathode 71, and the second output is coupled from the anode 73. A lead 75 couples from cathode 71 across impedance 79 and serially through impedance 82 to control grid 83 of electron discharge device 85, and a second lead 77 couples from the anode 73 serially through the impedances 91 and 93 to the control grid 95 of the electron discharge device 97. The impedances 84 and 102 connected to the anodes 81 and 101 of the electron discharge devices 85 and 97, respectively, are conventional anode voltage dropping impedances. The grid 95 of the electron discharge device 97 is biased by the impedances 91, 103, 105, 107 and 35 connected across the terminals of the source 39 such that electron discharge device 97 is normally conducting. The cathode 89 of the electron discharge device 85 and the cathode 99 of the electron discharge device 97 are connected to one another, and have a common cathode impedance 109. The output from the electron discharge devices 85 and 97 is taken across the impedance 109, with reference to ground, and is coupled through the impedance 111 to the control grid 113 of the output amplifier 115. The control grid 113 of the amplifier 115 is biased through the impedances 117, 111 and 109 connected by the lead 120 between the negative terminal of the source 39 and ground reference, such that the amplifier 115 is normally not conducting, that is, cut off. The anode 116 of the amplifier 115 is connected in series with a relay 119 to the positive terminal of the source 39. A contact arm 121, actuated by the relay 119, is coupled in series with a control circuitry 123 including therein an indicator 125 and a battery 127. Should the relay 119 be deenergized, the contact 121 will be actuated in a manner to disconnect one terminal of the battery 127, in the auxiliary circuit 123, from the indicator 125.

The auxiliary circuit 123 has associated therewith a relay 131 which is connected in series with a resistor 124 between the negative terminal of the source 39 and ground reference. A contact arm 133, actuated by the relay 131, is coupled in series with the indicator 125 and the battery 127. The relay 131 is normally energized by the source 39. Should the source 39 fail, the contact arm 133 will be actuated in a manner to disconnect one terminal of the battery 127 to deenergize the indicator 125.

In operation, assume the computer 11 is functioning properly and a positive signal voltage of predetermined amplitude is coupled to the grid 17 of the cathode follower 19. The stepped-down positive output of the cathode follower 19 is coupled to the grid 27 of electron discharge device 29. With no signal present, the electron discharge device 29 would normally be held nonconducting due to the voltage developed across the common cathode impedance 46 by current flow through the amplifier 45. Since the electron discharge device 45 normally tends to conduct due to the bias on the grid 47, current flow through the cathode impedance 46 provides a bias between grid 27 and cathode 26 such as to render the electron discharge device 29 nonconducting. A signal of the predetermined amplitude fed to the electron discharge device 29 will overcome the bias between the grid 27 and the cathode 26 and the electron discharge device 29 will conduct. The increased voltage developed across the impedance 46 will decrease conduction in the electron discharge device 45. The voltage coupled through the wiper arm 49 to the grid 47 sets the bias between the grid 47 and the cathode 48 to control the degree of conduction in electron discharge device 45 to establish the voltage level to which the circuit 9 will be responsive, and thus the reference amplitude to which the instantaneous output from the computer 11 will be compared.

A negative output is obtained from the electron discharge device 29 which is amplified and inverted in the amplifier 61, and then coupled to the paraphase amplifier 69. A positive output from the amplifier 69 couples from the cathode 71 to the grid 83 of the electron discharge device 85, and a second output which is of opposite or negative polarity couples to the grid 95 of the electron discharge device 97. As noted hereinabove, the electron discharge device 97 will normally tend to be conducting. The electron discharge device 85 will tend to be nonconducting due to the bias between grid 83 and cathode 89 developed by current flow through the impedance 109 caused by conduction of the electron discharge device 97.

When the input voltage is of an amplitude within a preset range as determined by the setting of the wiper arm 31, a positive voltage signal of predetermined amplitude is obtained from the cathode 71 of the amplifier 69 and fed to the grid 83 of the electron discharge device 85, and a negative voltage signal of predetermined amplitude is obtained from the anode 73 of the electron discharge device 69 and fed to the grid 95 of the electron discharge device 97. The electron discharge device 85 will overcome the voltage developed across the impedance 109 and will begin to conduct, whereas the electron discharge device 97, due to the negative signal fed to the grid 95, will conduct less heavily. Thus, when a signal of predetermined amplitude is received by the circuit 9, both of the electron discharge devices 85 and 97 will conduct concurrently and will develop a voltage of maximum amplitude across the impedance 109.

The control grid 113 of output amplifier 115 is biased such that the amplifier 115 is normally nonconducting. A voltage developed across the impedance 109 will be of sufficient amplitude to overcome the bias on the control grid 113 and to cause the amplifier 115 to conduct only during those periods when both of the electron discharge devices 85 and 97 are conducting concurrently.

The relay 119 in the anode 116 circuit of the amplifier 115 will be energized due to conduction of the amplifier 115. Should the amplifier 115 cease to conduct, a contact arm 121 controlled by the relay 119 will be actuated in such a manner to disconnect the series connections of the battery 127 and the indicator 125 in the auxiliary control circuit 123. Therefore, if the input voltage from the computer 11 departs from a preset amplitude level, that is, if the input voltage varies either above or below a preset range as set by the wiper arm 31, the relay contacts 121 will be actuated in such a manner as to deenergize the indicator 125 in the external circuitry 123. It will of course be understood that the indicator 125 may comprise one or several forms of indicating means, such as lamps, or control circuitry of any suitable type.

The sensitivity of the circuit 9 is adjusted by means of the wiper arm 31. For one application the sensitivity or range of response is adjusted to be 0.3 volt, that is, variations of more than plus or minus 0.3 volt from a preset level are detected.

If the amplitude of the voltage input to the detector circuit 9 is above a preset level, the voltage fed to the grid 83 of the electron discharge device 85 will be of a large positive amplitude and the voltage fed to the grid 95 of the electron discharge device 97 will be negative causing the electron discharge device 85 to conduct more heavily, and causing conduction in the electron discharge device 97 to decrease markedly. If the amplitude of the voltage input to the detector circuit 9 is below the preset level, the voltage fed to the grid 83 of the electron discharge device 85 will be of a low positive amplitude insufficient to cause appreciable conduction in the electron discharge device 85. At the same time, the negative voltage fed to the grid 95 of the electron discharge device 97 will be of sufficient amplitude to markedly affect conduction in the electron discharge device 97, and said electron discharge device 97 will continue to conduct heavily. The result in both instances is that the total current flow through the impedance 109 is less than when both electron discharge devices conduct concurrently, and the resulting voltage developed across the impedance 109 is not sufficient to maintain conduction in the amplifier 115.

The auxiliary circuit 123 includes a relay 131 provided to monitor the operation of the source 39. Without the relay 131, and should the negative potential from the negative terminal of the source 39 fail to be impressed on the grid 113 of the amplifier 115, the amplifier 115 would conduct, continuing to energize the relay 119, thus providing an inconclusive indication of the amplitude of the input voltage from the computer 11. To prevent such an erroneous indication, the contact arm 133 of the relay 131 is connected in series with the contact arm 121 of relay 119. Should the source 39 fail, the relay 131 will be actuated in a manner such as to also disconnect one terminal of the battery 127 from the indicator 125.

While our invention has been described with reference to a particular embodiment thereof, it will be understood that various modifications may be made by those skilled in the art without departing from the invention.

The appended claims are therefore intended to cover all such modifications within the true spirit and scope of the invention.

Having thus described our invention, what we claim is:

1. A voltage detector circuit, comprising, in combination, a paraphase amplifier having first and second output voltages of opposite polarity in response to an applied input voltage, first and second electron discharge devices each including an anode, a cathode and a control electrode, the cathodes of said devices being connected to one another, a common cathode circuit for said devices including an impedance, means for concurrently applying said first and second outputs to the control electrodes of said first and second devices, respectively, means biasing said devices to maximum total conduction when said applied voltage is within a predetermined range, whereby the voltage across said impedance is reduced from a maximum when said applied voltage exceeds said range in either direction, a relay, and means responsive to the voltage developed across said impedance for actuating said relay when said voltage is at its maximum.

2. In a voltage amplitude detector circuit, the combination comprising, first and second electron discharge devices each having an anode, an anode circuit, a control electrode, and a cathode, a common cathode circuit for said devices, means for applying an input signal voltage to the control electrode of said first device, means for biasing the control electrode of said second device to preset the reference amplitude level of the anode potential of said first device, a paraphase amplifier having an input coupled to the anode of said first device for producing a pair of output signals of opposite polarity in response to the potential of said anode, adjustable degenerative feedback means for applying a portion of one of said output signals to the control electrode of said first device to preset the sensitivity range of said paraphase amplifier, third and fourth electron discharge devices each including an anode, a cathode and a control electrode, the cathodes of said devices being connected to one another, a common cathode circuit for said devices including an impedance, means for concurrently applying said output signals to the control electrodes of said third and fourth devices, respectively, means biasing said third and fourth devices to maximum total conduction when said input signal voltage is within a predetermined range, whereby the voltage across said impedance is reduced from a maximum when said input signal voltage exceeds said range in either direction, a fifth electron discharge device, means coupling the output voltage developed across said impedance to said fifth device, said fifth device being energized to conduct only upon receiving said maximum voltage developed across said impedance, a relay connected to said fifth device and arranged to be energized by conduction thereof, indication means, and means controlled by said relay for actuating said indication means when said relay is deenergized.

References Cited in the file of this patent

UNITED STATES PATENTS

| | | |
|---|---|---|
| 2,406,882 | Young | Sept. 3, 1946 |
| 2,572,850 | Francis | Oct. 30, 1951 |
| 2,722,640 | Merrill | Nov. 1, 1955 |
| 2,802,102 | Imm | Aug. 6, 1957 |